Sept. 1, 1964 A. G. SCHILBERG 3,147,026
STAMPED STEERING KNUCKLE AND BRAKE BACKING PLATE WELDMENT
Filed Dec. 15, 1961
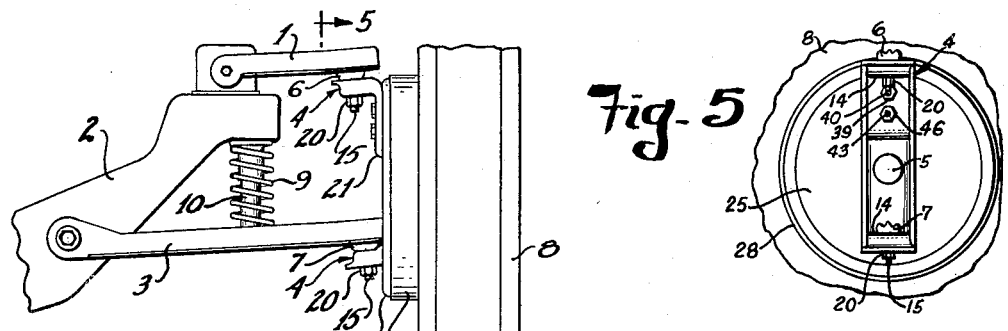
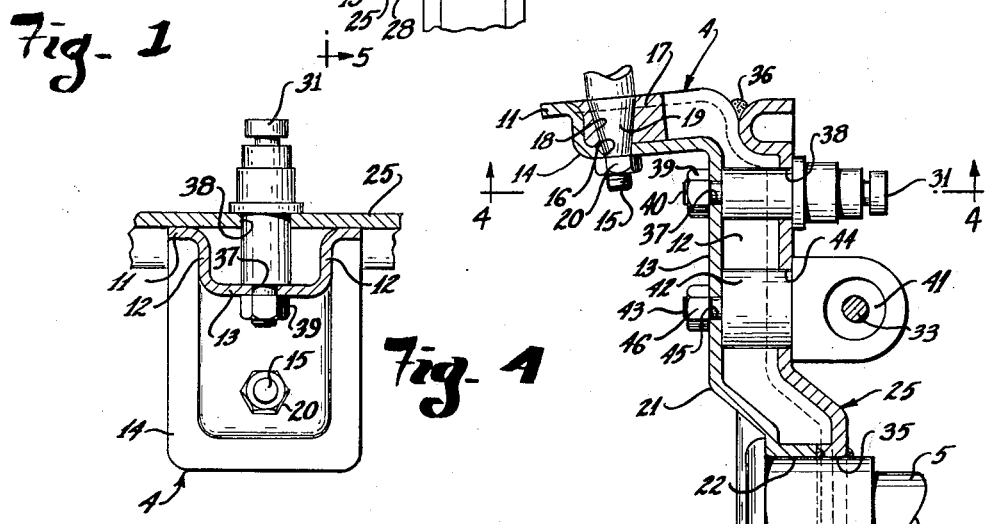
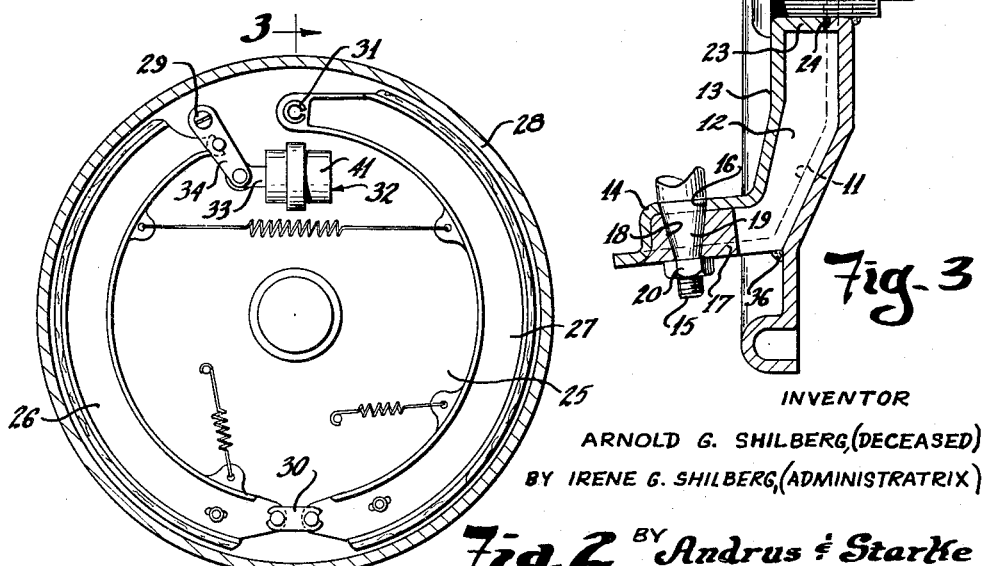
INVENTOR
ARNOLD G. SHILBERG, (DECEASED)
BY IRENE G. SHILBERG, (ADMINISTRATRIX)
BY Andrus & Starke
Attorneys

United States Patent Office 3,147,026
Patented Sept. 1, 1964

3,147,026
STAMPED STEERING KNUCKLE AND BRAKE BACKING PLATE WELDMENT
Arnold G. Schilberg, deceased, late of Milwaukee, Wis., by Irene G. Schilberg, administratrix, Milwaukee, Wis., assignor to A. O. Smith Corporation, Milwaukee, Wis., a corporation of New York
Filed Dec. 15, 1961, Ser. No. 160,423
3 Claims. (Cl. 280—96.2)

This invention relates generally to the steering knuckle of an independent wheel suspension system and particularly relates to a steering knuckle and brake backing plate composite structure or weldment.

In the past, the steering knuckles of wheel suspensions have invariably been constructed of heavy forgings to provide the required strength and rigidity to withstand vehicle loads and ultimate braking forces imposed thereon in use. The cost of these knuckles has been quite high as a result, particularly as the forgings were required to be machined to within close tolerance limits for attachment to the various parts of the suspension system.

These braking forces were taken initially by the backing plate of the brake mechanism which was secured to the outboard face of the knuckles and in close proximity to the brake drum of the wheel by a bolted connection. The backing plate was required to be of substantial gauge to resist these braking forces and to provide adequate support for the brake shoes, anchor pins, and the hydraulic piston-cylinder unit of the braking mechanism carried thereby.

It is now proposed to provide a weldment consisting of the steering knuckle and brake backing plate to enable a lighter, more inexpensive construction for each.

In accordance with the invention, the steering knuckle consists of a unitary sheet metal stamping having a hat shaped sectional area. The knuckle is disposed in the suspension system in outboard opening relation with the end portions being bent normally of the longitudinal axis of the knuckle for attachment to the upper and lower control arms of the suspension. Preferably, the ends of the knuckle are provided with cast fused metal plugs to impart increased strength in the control arm attachment areas. The wheel spindle mounting the wheel hub and rim assembly is welded to the knuckle adjacent the lower end portion thereof.

The brake backing plate is assembled flatwise against the outboard face of the knuckle and is welded thereto to provide a composite structure. The various parts of the brake mechanism, including the anchor pin of the shoes and the hydraulic cylinder, are preferably attached to the backing plate through the steering knuckle so that the weldment carries the braking forces and hydraulic pressures. This enables the backing plate to be made lighter and more inexpensively than in previous designs where such forces are taken initially by the plate alone.

By welding the backing plate to the knuckle, the plate and knuckle are able to mutually reinforce one another with the result that the knuckle, though of stamped construction, is as strong and rigid as knuckles of forged construction and yet is much lighter and cheaper of construction. This factor, together with the lighter gauge construction of the backing plate, gives the structure of the present invention a substantial competitive edge over anything previously known in the art.

The drawing illustrates the best mode presently contemplated of carrying out the invention.

In the drawings:

FIG. 1 is a side elevation of an independent wheel suspension incorporating the improved steering knuckle weldment of the invention;

FIG. 2 is an elevation view of the steering knuckle weldment from the outboard side of the suspension showing the general arrangement of the fluid motor, anchor pin and brake shoes on the weldment;

FIG. 3 is a diametric sectional view of the weldment of the invention taken along the lines 3—3 of FIG. 2 with various adjunctive parts secured thereto being shown in elevation;

FIG. 4 is a section of the weldment along the lines 4—4 of FIG. 3 showing the manner in which the hydraulic motor is secured; and FIG. 5 is a view taken on the line 5—5 of FIG. 1.

Referring to the drawings, a wheel suspension is shown having an upper control arm 1 attached at its inner end to a frame cross member 2 for vertical oscillating movement and a lower control arm 3 similarly connected to cross member 2 in a vertical plane with arm 1. The outer ends of arms 1 and 3 are connected to the opposite ends of a steering knuckle 4 carrying a wheel supporting spindle 5 by the ball joints 6 and 7 respectively to thereby provide for turning and oscillating movement of an associated ground engaging wheel 8. The weight of the vehicle is carried by a coil spring 9 seated between lower arm 3 and cross member 2 coaxially about a shock absorber 10 serving to dampen wheel shock loads from the vehicle.

The steering knuckle 4 of the illustrated suspension is required to be quite rigid and strong to sustain the extremely heavy stresses in tension and compression imposed thereon by the vehicle and wheel loads and to withstand twisting forces arising during the braking of the vehicle. At the same time, the knuckle should preferably be of fairly lightweight construction and lend itself to economical manufacture. The knuckle construction which will now be described is designed to meet these general requirements in a novel manner.

As can be seen best in FIGS. 3 and 4, the proposed knuckle 4 is formed of a unitary sheet metal stamping of open, hat sectional configuration. The knuckle 4 extends vertically in the suspension in outwardly opening relation so that the flanges 11 along either side of the opposed parallel legs 12 of the stamping and which are coextensive with the web 13 thereof are outermost for a purpose to be explained.

The knuckle end portions 14 are bent inwardly and generally normal to the vertical axis of knuckle 4 to form a generally U-shaped knuckle configuration. End portions 14 are connected to control arms 1 and 3 by the studs 15 forming a part of the ball joint structures 6 and 7 previously referred to. Each of studs 15 is received within a corresponding opening 16 provided in the web 13 of the end portions 14 and, in order to reinforce the knuckle in these attachment areas, a cast fused metal plug 17 of annular construction is deposited in the open knuckle in surrounding relation with each of the openings 16. Plugs 17, as shown, have a tapered bore 18 therein and the studs 15 have a correspondingly tapered surface 19 in order to effect wedging engagement between studs 15 and knuckle 4 upon tightening of the nuts 20 threaded to each of the studs 15. In this manner, the knuckle 4 may be made of fairly light gauge stock overall and yet have the precise reinforcement required to sustain the added stresses in the control arm attachment areas. The exact manner in which plugs 17 are formed and deposited is the subject matter of co-pending application, Serial No. 160,428, filed December 15, 1961, and which has a common inventor and assignee with the instant application.

The vertical portion 21 of the knuckle 4 is provided with a spindle assembly opening 22 near lower end portion 14. Opening 22 is punched in web 13 at the desired vertical level and the edge of the opening extruded outwardly or within knuckle 4, as shown, to provide a support sleeve or flange 23 for spindle 5. A fillet weld 24 is laid between flange 23 and the corresponding portion of spindle 5 and the inboard end of the spindle 5 is enlarged to secure the latter rigidly within knuckle 4.

The basic construction of knuckle 4 enables it to withstand fairly appreciable stresses in tension, compression, and torque due to the hat shaped sectional configuration. However, in order to further increase the load carrying ability of the knuckle or conversely to enable a lighter construction therefor, it is contemplated herein to combine knuckle 4 with the backing plate 25 of the wheel braking mechanism to provide an integrated weldment. Plate 25 is of circular construction and carries a pair of brake shoes 26 and 27 on its outboard face in closely spaced relation to a brake drum 28 which is formed as a part of the wheel support structure. Shoe 26 is the primary brake shoe in the particular mechanism shown (as the drum rotates counterclockwise) and is pivotally attached at its upper end by a pin 29 inserted through plate 25. The lower end of shoe 26 is connected to the corresponding end of shoe 27 through a linkage 30 while the upper end of shoe 27 is pivoted to an anchor pin 31 attached to plate 25 as will be described. The shoes 26 and 27 are applied against drum 28 by a suitable hydraulic piston-cylinder unit 32 carried on plate 25. The piston member 33 of unit 32 is connected to brake shoe 26 by a link 34 such that upon piston extension, shoe 26 is initially forced against drum 28 which in turn pivots shoe 27 against the drum 28. It will be appreciated then that anchor pin 31 takes the brake reaction forces from both brake shoes 26 and 27.

In forming the weldment, plate 25 is laid flatwise against the outboard face of knuckle 4 with spindle 5 projecting outwardly through an opening 35 provided in the plate and the plate is then secured to the knuckle along corresponding portions of the plate 25 and knuckle flanges 11 by a continuous edge weld 36. At the same time, another fillet weld 24 is laid around spindle 5 and the edge of backing plate opening 35. The flanges 11 provide a fairly wide support base for the plate enabling a rigid attachment to be effected therebetween and effectively stabilizing the plate on the knuckle. As shown, plate 25 encloses the entire vertical portion 21 of knuckle 4 and there thus is provided an extremely strong and rigid reinforced knuckle construction. At the same time, plate 25 itself is reinforced by knuckle 4 and is in this manner able to carry quite heavy torsional stresses in relation to its thickness and overall weight.

The weldment formed of knuckle 4 and backing plate 25 is designed to take the load on anchor pin 31 and the hydraulic pressure of piston-cylinder unit 32 to relieve these loads from the backing plate proper. For this purpose, the upper end of knuckle vertical portion 21 is provided with a web opening 37 while an aligned opening 38 is provided in plate 25. Anchor pin 31 is inserted through openings 37 and 38 from the outboard side of the weldment and into and through the upper end of brake shoe 27. The pin 31 is secured in this position by a nut 39 threaded to a stud 40 formed on the inboard end of pin 31, as shown. With regard to the attachment of unit 32, the cylinder 41 thereof is formed integrally with a base member 42 having an attachment stud 43. An opening 44 is provided in backing plate 25 to receive base member 42 and a smaller opening 45 is provided in web 13 to receive stud 43 with the cylinder being drawn firmly against the weldment by a nut 46 threaded to the stud. The loads on anchor pin 31 and the hydraulic forces of unit 32 are in this manner distributed directly into the composite steering knuckle and backing plate structure which because of its high overall strength is admirably suited for this purpose.

As compared to the usual construction, wherein the backing plate is initially required to take such loads, the present construction permits the plate 25 to be made considerably lighter and hence enables a commensurate saving in cost of manufacture thereof. Then, too, as the piston-cylinder unit 32 is carried primarily by the weldment, rather than by the backing plate 25, no special reinforcement or attachment bracket need be formed on the face of the plate as in previous designs.

The steering knuckle of the present invention when welded with the backing plate is able to effectively sustain all necessary stresses arising in vehicle operation. Yet when compared with the conventional knuckles of forged construction and which were bolted to the brake backing plate, the present construction is considerably more inexpensive of manufacture.

Various modes of carrying out the invention are contemplated as being within the scope of the following claims particularly pointing out and distinctly claiming the subject matter which is regarded as the invention.

What is claimed is:

1. In an independent wheel suspension of a vehicle having a wheel spindle and upper and lower control arms, an upright sheet metal steering knuckle having an outwardly opening generally U-shaped cross-sectional area and formed with an apertured and flanged center portion defining a cylindrical bearing receiving the spindle, said knuckle having inwardly bent end portions pivotally connected to corresponding upper and lower control arms, said end portions provided with metal plugs and connected to said control arms through said plugs, and a flat sheet metal brake drum backing plate welded against the outer face of said steering knuckle between said end portions to provide a highly rigid and strong composite structure.

2. In an independent vehicle wheel suspension which includes upper and lower control arms and a wheel spindle, a vertically extending sheet metal steering knuckle having an outwardly opening flanged channel-shaped cross-sectional area, the central portion of said knuckle being apertured and flared outwardly to provide a bearing for said spindle and the ends of said knuckle formed inwardly and attached to the corresponding upper and lower control arms, said end portions being locally reinforced in the area of said attachment, and a sheet metal brake drum backing plate welded flatwise to the outer side of said steering knuckle between the end portions thereof.

3. A steering knuckle and brake backing plate weldment for an independent wheel suspension system of a vehicle comprising a steering knuckle formed of a sheet metal stamping of generally U-shaped open cross-sectional area, a brake backing plate welded flatwise against the knuckle on the open face thereof to enable said knuckle and backing plate to mutually strengthen and rigidify one another, and a brake shoe anchor pin attached to the backing plate through the knuckle from the face thereof opposite said backing plate to effectively distribute braking reaction forces on said pin to the combined knuckle and backing plate structure.

References Cited in the file of this patent
UNITED STATES PATENTS

| | | |
|---|---|---|
| 2,297,901 | Leighton | Oct. 6, 1942 |
| 2,435,814 | Allison | Feb. 10, 1948 |
| 2,449,306 | Leighton | Sept. 14, 1948 |
| 2,866,650 | Holmstrom | Dec. 30, 1958 |
| 2,885,035 | Rubly | May 5, 1959 |
| 3,007,728 | Hoffman | Nov. 7, 1961 |